Patented Mar. 12, 1935

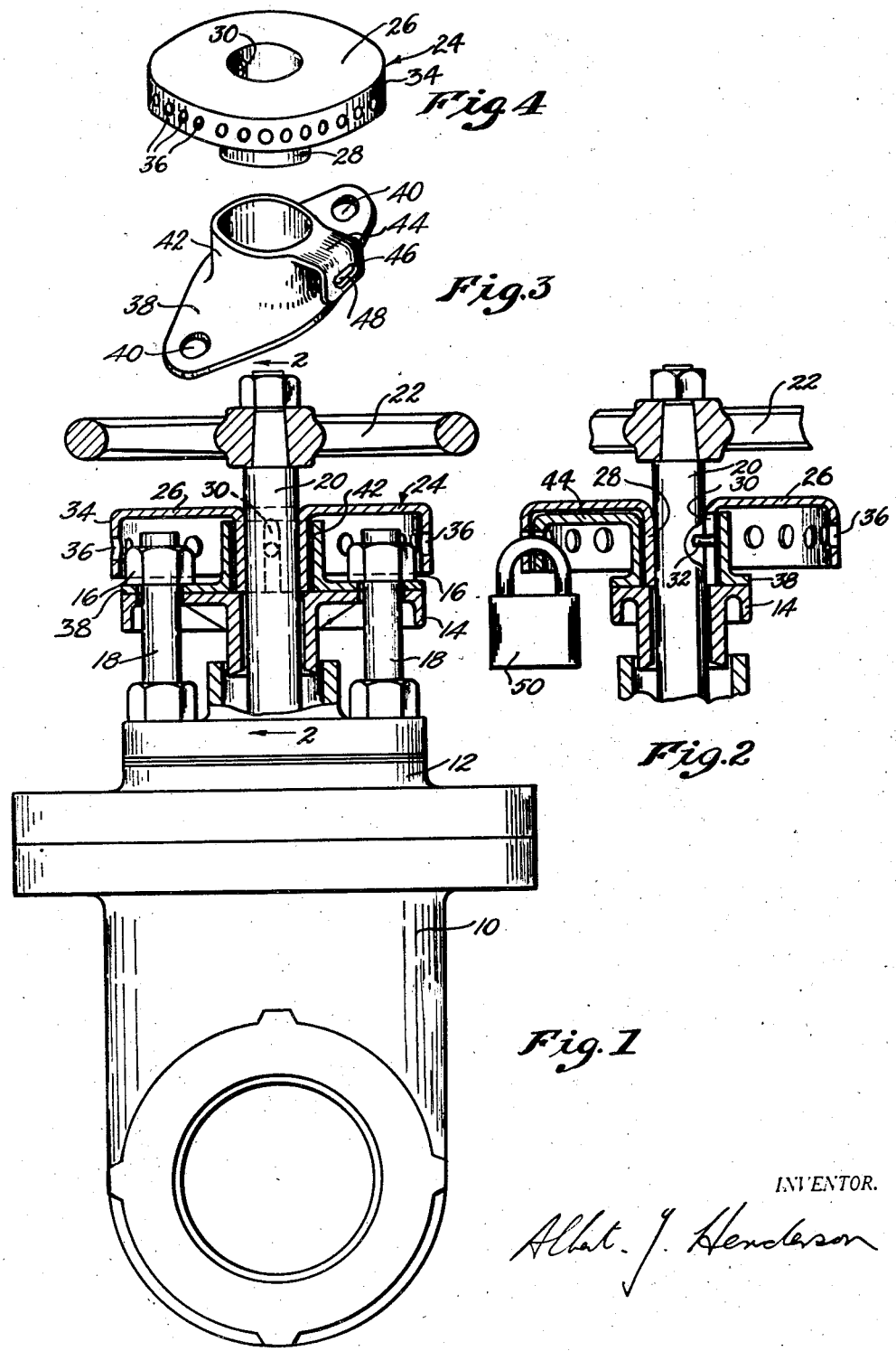

1,993,784

UNITED STATES PATENT OFFICE 1,993,784

LOCKING DEVICE

Albert J. Henderson, Hempfield Township, Westmoreland County, Pa., assignor to Walworth Patents Inc., Boston, Mass., a corporation of Massachusetts Application December 14, 1933, Serial No. 702,302

13 Claims. (Cl. 70—125)

This invention relates to locking devices and more particularly to locking devices for spindles.

One object of the invention is to prevent unauthorized rotation of a spindle.

Another object of the invention is to permit the spindle to be locked in any desired position.

Another object of the invention is to permit authorized rotation of a spindle without removal of the device therefrom.

Another object of the invention is to provide for self-adjustment of the device to compensate for wear.

Another object of the invention is to provide a device which will be simple to use and economical to manufacture.

Other objects and advantages will become apparent from the following description taken in connection with the accompanying drawing, wherein Fig. 1 is a front elevation of a valve partly in section, showing the device applied to the spindle thereof.

Fig. 2 is a section taken on the line 2—2 of Fig. 1 looking in the direction indicated by the arrows.

Figs. 3 and 4 are perspective views of the device showing the parts separated.

Referring more particularly to the drawing, the locking device for illustrative purposes is applied to a gate valve having a non-rising spindle. The valve comprises a casing 10 having a bonnet 12 adapted to receive a packing gland 14 of the usual substantially elliptical contour. The gland 14 is adjustable by means of the nuts 16 which engage studs 18 projecting from the bonnet 12 through the gland. A spindle 20 also projects from the bonnet 12 and is provided with the usual operating handle 22.

The locking device of this invention is designed to prevent unauthorized rotation of the spindle 20 to operate the valve. Accordingly, a member 24 is provided which is adapted to cover the gland adjusting means. This member 24 comprises an annular disc 26 having a depending hub portion 28 which is preferably a sliding fit on the spindle 20 and is adapted to seat upon the gland 14. Suitable means are provided to prevent relative rotation of the spindle 20 and cover 24 while permitting longitudinal movement of the cover member when the packing gland 14 is adjusted. This means, in this instance, comprises a slot 30 extending from one end of the hub 28 and terminating adjacent the other end thereof. A pin 32 extending from the spindle 20 engages with this slot.

Depending from the periphery of the disc 26 is a rim or flange portion 34 which extends over and substantially covers the nuts 16. Midway between the ends of the rim and extending therearound preferably at equally spaced distances is a plurality of perforations 36.

The other portion of the locking device comprises a flat body portion 38 which is shaped to correspond with the substantially elliptical contour of the gland 14. The body portion 38 is provided with perforations 40 which are of such size and are so located in the body as to fit over the studs 18. The body 38 can thereby be rigidly secured to the gland 14 by means of the nuts 16.

A hub 42 projects from the body 38 and is adapted to telescope on the hub 28 of the cover member 24. The hub 42 terminates short of the underside of the disc portion 26 and is provided with a flange in the form of an arm 44 which extends substantially parallel with the body 38 along the underside of the disc portion 26. As shown in Fig. 3 this arm 44 is located on the hub 42 at right angles with respect to the holes 40 for a purpose which will be described hereinafter. The arm 44 has a depending lip portion 46 which extends in proximate relation to the inner side of the rim 34. A slot 48 is formed in the lip 46 and is of sufficient length to extend from the center of one of the perforations 36 to the center of an adjacent perforation.

The body 38 and cover 24 are preferably made of metal by any suitable means such as stamping, forging or casting.

In applying the device to a valve of the type illustrated the handwheel 22 and nuts 16 are first removed. The body member 38 is then placed on the spindle 20 with the holes 40 engaging with the studs 18. The nuts 16 can then be replaced to rigidly secure the body 38 to the gland 14. The spindle 20 will previously have been drilled for the reception of the pin 42 which is left projecting a short distance as shown in Fig. 2. The cover member 24 is then placed on the spindle with the slot 30 engaging the pin 32 and the hub 28 telescoping with the hub 42 on the body 38.

The handle 22 can then be replaced and the valve is ready for operation. In order to lock the spindle against unauthorized rotation all that is necessary is to insert the staple of a common padlock 50 through the slot 48 and its comating perforation 36. As the slot 48 is coextensive with the spacing of adjacent perforations 36 a very small amount of back lash in the spindle will insure of the padlock being easily applied. Such back lash is inherent in all valves of the type illustrated and need be of a negligible amount to insure of the slot 48 comating with one of the perforations 36.

As previously mentioned the arm 44 of the body 38 extends from the hub at right angles to the holes 40. The reason for this arrangement is to locate the slot 48 opposite the narrow portion of the gland 14 so that the padlock may be readily applied to the device without interference with the gland. It will be understood that the rim 34 of the cover 24 is located close to the nuts 16, as shown in Fig. 1, to prevent tampering therewith by unauthorized parties.

When it is desired to operate the valve it is merely necessary to remove the padlock 50 whereupon the spindle 20 can be rotated.

From the foregoing it will be seen that the invention prevents unauthorized rotation of the spindle by merely applying a padlock thereto. Furthermore, the device does not interfere with the adjustment of the packing gland and will accommodate itself to variations in the position of this gland on the spindle caused by tightening of the packing. The device consists of but two parts which are easy to use and economical in manufacture.

I claim:—

1. In a locking device, a cover member, a hub on said cover, a rim on said cover having a plurality of spaced perforations therein, a second member adapted to be housed within said cover, and a flange on said second member extending in proximate relation to said rim and having a slot therein, said slot being coextensive with the spacing of adjacent perforations to comate with any one of said perforations to receive connecting means therethrough.

2. In a locking device, a cover member, a hub on said cover, a rim on said cover having a plurality of spaced perforations therein, a second member adapted to be housed within said cover, a hub on said second member telescoping on the hub of said cover, a flange on the hub of said second member, and a lip on said flange extending in proximate relation to said rim and having a slot therein, said slot being coextensive with the spacing of adjacent perforations to comate with any one of said perforations to receive connecting means therethrough.

3. A locking device for a spindle, comprising a member mounted on said spindle and normally rotatable therewith, means concealed by said member for securing it to the spindle and a stationary member adapted to be connected to the first member for preventing rotation of said spindle.

4. A locking device for a spindle, comprising a member slidable on said spindle, concealed means for securing said member to the spindle for rotation therewith, and a stationary member adapted to be connected to the first member for preventing rotation of said spindle.

5. A locking device for a spindle with stationary parts adjacent thereto, comprising a member having a hub, means concealed by said hub and engaging the spindle and hub for normally rotating said member with the spindle, and a second member secured to said stationary parts adapted to be connected to the first member for preventing rotation of said spindle, said first member concealing the means securing the second member to said stationary parts.

6. A locking device for the spindle of a valve, said valve having a packing gland with adjusting means therefor adjacent said spindle, comprising a member having a portion overlying said adjusting means, a hub on said member slidable on the spindle, means engaging said hub for preventing independent rotation of said member and spindle, a second member supported by said gland and rigidly fixed thereto by said adjusting means, and means projecting from the second member into proximate relation with the overlying portion of the first said member.

7. A locking device for the spindle of a valve, said valve having a packing gland with adjusting means therefor adjacent said spindle, comprising a cover overlying said adjusting means, a hub on said cover slidable on the spindle, means engaging the spindle and hub for normally causing rotation of said member with the spindle, a rim on said cover having a plurality of spaced perforations therein, a second member supported by said gland and rigidly fixed thereto by said adjusting means, a hub on said second member telescoping on the hub of said cover, a flange on the hub of said second member, and a lip on said flange extending in proximate relation to said rim and having a slot therein, said slot being coextensive with the spacing of adjacent perforations to comate with any one of said perforations to receive connecting means therethrough.

8. In a locking device for the spindle of a valve, said valve having a packing gland with adjusting means therefor adjacent said spindle, a member clamped to the gland by said adjusting means, a second member carried on the spindle and overlying said adjusting means, a flange on said second member extending toward the gland and substantially enclosing the adjusting means, and means on the first member extending into proximate relation with the flange for connecting the one member to the other.

9. A locking device for the spindle of a valve, said valve having a packing gland with adjusting means therefor adjacent said spindle, comprising a member having a portion overlying and concealing said adjusting means, a hub on said member slidable on the spindle and having an internal slot opening from one end and terminating adjacent the other, said spindle being provided with a projection entering said slot and preventing independent rotation of said member and spindle, a second member supported by said gland and rigidly fixed thereto by said adjusting means, and an arm projecting from the second member into proximate relation with the overlying portion of the first member.

10. A locking device for the spindle of a valve, said valve having a packing gland of elliptical contour having adjusting means adjacent each end of its major axis, comprising a perforated member having a portion overlying and concealing said adjusting means, means concealed by said member for securing it to the spindle, a second member supported by said gland and rigidly fixed thereto by said adjusting means, and an arm projecting from said second member substantially normal to said major axis of the gland and having a perforation adapted to comate with a perforation in the first member to receive connecting means therethrough.

11. The combination with a valve having a spindle and a stationary element adjacent said spindle, of a perforated member carried on the spindle and overlying said element, concealed means for securing said member to the spindle for rotation therewith, and a second member engaging said stationary element having a perforation adapted to comate with a perforation in the first member to receive connecting means therethrough.

12. The combination with a valve having a spindle and a stationary element adjacent said spindle, of a perforated member overlying said element, a hub on said member engaging the spindle, means concealed by the hub and engaging both spindle and hub for normally causing rotation of said member with the spindle, and a second member secured to said stationary element having a perforation adapted to comate with a perforation in the first member to receive connecting means therethrough, said first member concealing the means securing the second member to said stationary element.

13. In a locking device for the spindle of a valve, said valve having a packing gland with adjusting means therefor adjacent said spindle, a member fastened to said spindle for rotation therewith and overlying said adjusting means, and a flange on said member extending toward the gland and substantially enclosing the adjusting means.

ALBERT J. HENDERSON.